Oct. 1, 1935.  J. CONTINENZA  2,016,074
TIRE VALVE CORE
Filed Nov. 19, 1934
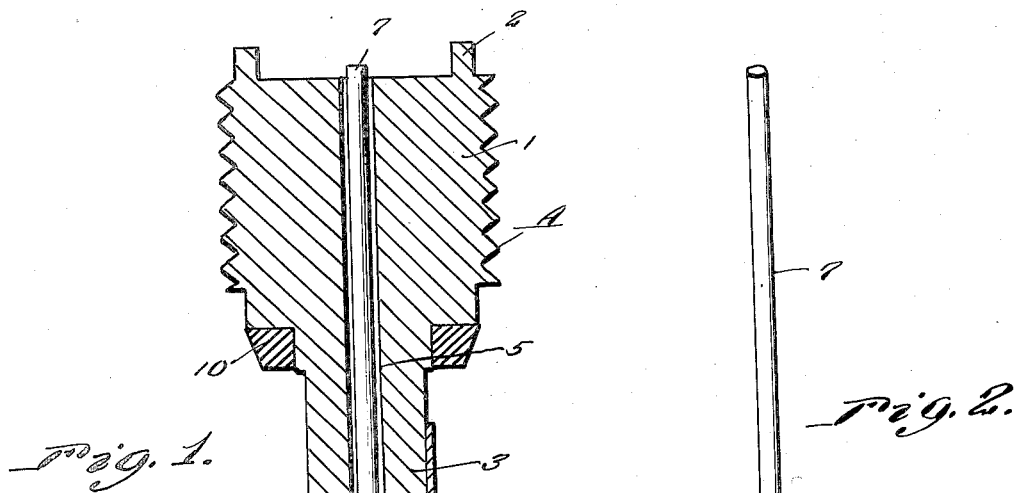
Fig. 1.  Fig. 2.
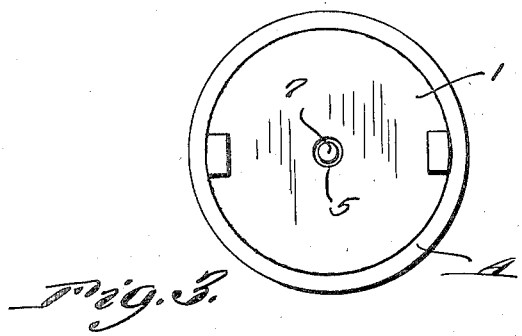
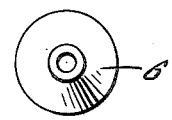
Fig. 3.  Fig. 4.
Inventor
Joseph Continenza
By Clarence A. O'Brien
Attorney Patented Oct. 1, 1935

2,016,074

UNITED STATES PATENT OFFICE 2,016,074

TIRE VALVE CORE

Joseph Continenza, St. Paul, Minn.

Application November 19, 1934, Serial No. 753,768

2 Claims. (Cl. 152—12)

This invention relates to a core for a tire valve stem, the general object of the invention being to so construct the core that when a leak occurs, it is simply necessary to replace a small resilient valve seat without replacing the other parts of the core.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a longitudinal sectional view through the core showing the parts in closed position.

Figure 2 is a view of the stem.

Figure 3 is a top plan view of Figure 1.

Figure 4 is a view of the plug or valve seat.

In the drawing, the body of the core is shown at A and is provided with the enlarged exteriorly threaded part 1 for screwing into the valve stem and has the lugs 2 at its top for enabling the core to be threaded into the stem and removed therefrom, the rest of the core being reduced and elongated as shown at 3 with the lower end of this part 3 having a conical recess 4 therein, the small end of which is in communication with the lower end of the bore 5 of the core. A substantially frusto-conical plug or valve seat 6 is removably seated in said recess and is formed of resilient material and a stem 7 passes through the bore and the plug and has a substantially semi-spherical lower end 8 which forms a seat for the plug or seat 6. A substantially L-shaped spring 9 has its long limb suitably connected with a portion of the part 3 and with its short limb spaced below the end of the part and engaging the head or end 8 of the stem for normally holding the parts in closed position as shown in Figure 1. Head 8 has a depending pin 11 extending through the hole 10′ in short limb 9′.

The usual gasket or washer 10 is carried by the lower part of the portion 1 for engaging the seat in the stem for providing an air-tight joint between the core and the stem.

This core is placed in the valve stem in the usual manner and when in place, the combined pressure of the spring 9 on the head 8 and air pressure in the tire will hold the parts in closed position as shown in Fig. 1 so that air cannot escape from the tire. When the tire is to be inflated, the usual chuck of an air supply device is placed on the outer end of the stem and the air pressure will force the seat or plug downwardly so that air can pass into the tire. As will be seen when leakage occurs, it is only necessary to remove the seat or plug 6 and replace it by a new one, the rest of the core continuing in service so that it is not necessary to throw away the entire core and thus repairs can be made very cheaply. With this invention, the tire can be easily and quickly inflated as the air will pass through the bore and between the plug and the seat or recess 4 with very little resistance and the flow of air is greater than in cores as now constructed.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A core for a valve stem comprising a body having an enlarged externally threaded outer part for threading in the outer part of a stem and an elongated reduced inner part having a conical recess in its inner end, said core having a bore passing from its outer end to the small end of the recess, a resilient plug fitting in the recess, a stem passing through the bore and through the plug and having a head at its inner end forming a seat for the plug, a substantially L-shaped spring providing a long arm and a short arm, the long arm being connected to a side portion of the reduced part of the body and the short arm extending partly over the inner end of the body and having a hole therein and a projection on the head extending into the hole, said spring holding the stem and plug in position with the plug engaging the walls of the recess.

2. A core for a valve stem comprising a body part externally threaded for threading in the valve stem, said core having a longitudinally extending bore terminating in a conical recess at the inner end of the body, a resilient plug fitting in the recess, a stem passing through the bore and the plug and having a head forming a seat for the plug, and a substantially L-shaped spring having a long arm and a short arm, the long arm being connected to a side part of the inner end of the body and the short arm extending in spaced relation partly across the inner end of the body and engaging the head for holding the stem and its head in a position with the plug contacting the walls of the conical recess.

JOSEPH CONTINENZA.